(12) United States Patent
Erofeev (10) Patent No.: US 7,631,351 B2
(45) Date of Patent: Dec. 8, 2009

(54) SYSTEM AND METHOD FOR PERFORMING STORAGE OPERATIONS THROUGH A FIREWALL

(75) Inventor: Andrei Erofeev, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 582 days.

(21) Appl. No.: 10/818,747

(22) Filed: Apr. 5, 2004

(65) Prior Publication Data

US 2005/0039051 A1 Feb. 17, 2005

Related U.S. Application Data

(60) Provisional application No. 60/460,183, filed on Apr. 3, 2003.

(51) Int. Cl.
| | |
|---|---|
| G06F 17/00 | (2006.01) |
| H04L 29/06 | (2006.01) |
| G06F 7/04 | (2006.01) |
| G06F 9/00 | (2006.01) |
| G06F 15/16 | (2006.01) |
| H04L 29/04 | (2006.01) |
| G06F 15/173 | (2006.01) |

(52) U.S. Cl. .................. 726/11; 713/150; 709/225; 709/232; 726/1; 726/13; 726/23

(58) Field of Classification Search .......... 709/225, 709/232; 713/150
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |

(Continued)

FOREIGN PATENT DOCUMENTS

EP 0 259 912 3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Shin-Hon Chen
(74) *Attorney, Agent, or Firm*—Perkins Coie LLP (57) ABSTRACT

The present invention provides systems and methods for performing storage operations through a firewall. Methods are provided that include, in a networked computer system, identifying, based on configuration data, whether each of a set of network elements is within a trusted network or not within the trusted network. Traffic between elements within the trusted network and elements not within the trusted network must pass through a firewall. The methods also include, prior to performing a storage operation through the firewall, allocating a specific set of ports, in accordance with at least one security parameter, for use in performing the storage operation. Methods are also provided which include monitoring traffic through the specific ports, and, if traffic is determined to be inactive through a first port of the specific ports, sending a packet through the first port.

25 Claims, 2 Drawing Sheets

U.S. PATENT DOCUMENTS

| | | | |
|---|---|---|---|
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,219,706 B1* | 4/2001 | Fan et al. | 709/225 |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,421,711 B1 | 7/2002 | Blumenau et al. | |
| 6,487,561 B1 | 11/2002 | Ofek et al. | |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,988,208 B2* | 1/2006 | Hrabik et al. | 726/23 |
| 2002/0004883 A1 | 1/2002 | Nguyen et al. | |
| 2002/0078377 A1* | 6/2002 | Chang et al. | 713/201 |
| 2003/0009444 A1* | 1/2003 | Eidler et al. | 707/1 |
| 2003/0065944 A1 | 4/2003 | Mao et al. | |
| 2003/0115447 A1 | 6/2003 | Pham et al. | |
| 2004/0044771 A1* | 3/2004 | Allred et al. | 709/227 |
| 2004/0078599 A1 | 4/2004 | Nahum | |
| 2004/0133772 A1* | 7/2004 | Render | 713/150 |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| WO | 95/13580 | 5/1995 |
| WO | 99/12098 | 3/1999 |
| WO | WO 02078267 A1 * | 10/2002 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and the recitation in claim 5).

* cited by examiner

SYSTEM AND METHOD FOR PERFORMING STORAGE OPERATIONS THROUGH A FIREWALL

RELATED APPLICATIONS

This application claims priority to Provisional Application No. 60/460,183, filed Apr. 3, 2003, the entirety of which is hereby incorporated by reference.

This application is also related to the following patents and pending applications, each of which is hereby incorporated herein by reference in its entirety:

U.S. Pat. No. 6,418,478, titled PIPELINED HIGH SPEED DATA TRANSFER MECHANISM, issued Jul. 9, 2002, Application Ser. No. 09/610,738, titled MODULAR BACKUP AND RETRIEVAL SYSTEM USED IN CONJUNCTION WITH A STORAGE AREA NETWORK, filed Jul. 6, 2000, Application Ser. No. 09/744,268, titled LOGICAL VIEW AND ACCESS TO PHYSICAL STORAGE IN MODULAR DATA AND STORAGE MANAGEMENT SYSTEM, filed Jan. 30, 2001, Application Ser. No. 60/409,183, titled DYNAMIC STORAGE DEVICE POOLING IN A COMPUTER SYSTEM, filed Sep. 9, 2002, Application Ser. No. 60/460,234, titled SYSTEM AND METHOD FOR PERFORMING STORAGE OPERATIONS IN A STORAGE NETWORK, filed Apr. 4, 2003,

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to performing storage operations through a firewall. More particularly, the present invention relates to providing a limited number of ports in a firewall for performing secure storage operations between components in a computer network.

Firewalls reside between components in a computer network and generally function to prevent unauthorized access to the network by evaluating which communications should be allowed to pass between the firewall's network and other networks or network components. A firewall thus divides a network into two parts: a friendly/secure side and a hostile side, wherein computers inside the firewall on the friendly side are protected from computers outside the firewall on the hostile side.

A firewall evaluates whether network traffic such as data streams, control messages, application data, communications packets, and other data meets specified security criteria and should be allowed to pass between components of the network. Data that does not meet the security criteria is generally discarded or otherwise blocked from passing between components. A firewall may comprise hardware elements, software components, or any combination thereof. Exemplary firewalls include packet filters, bastion hosts, application or circuit-level gateways, and proxy servers.

One method used by firewalls to prevent unauthorized communications is to restrict network communications to specified ports. A port is generally used by TCP/IP, UDP, and other communication protocols to represent the logical endpoint of a particular connection. For example, HTTP traffic associated with a particular computer might be routed through port 80. Various programs, services, and other applications on a computer often run listening processes for network traffic directed to a particular port. Limiting network communications to specific ports and closing all unused ports generally reduces the risk of unauthorized access to a computer since these programs, services, and other applications could be compromised or otherwise exploited by a hacker to gain access to the computer.

Firewalls provide additional security by timing out network sessions beyond a specified time period. Thus, ports do not remain unnecessarily open in the event of network connection failures, slowdowns, or other events which might create vulnerabilities. For example, any network sessions that become idle beyond a preconfigured timeout period are automatically disconnected without warning. Further, after making a new connection, a first packet must be sent within a timeout period or the connection is also disconnected.

Existing storage management systems, however, use many thousands of ports to conduct storage operations through a firewall. Typically, these systems keep large sets of known ports open during backups and restores. Each of the streams of data sent as part of a backup, a restore, or other storage operation must have a port open in the firewall to pass the data. For example, data pieces come through multiple streams, control signals come through other streams, status messages come yet other streams, etc. The head end (sender) and tail end (receiver) of existing systems, however, do not know which ports all of the data is coming through, so they generally reserve large blocks of ports in the firewall to accommodate the various streams of data that they anticipate. Furthermore, these systems also must keep many ports open since slow network connections and other factors may cause a connection to timeout and the firewall to close an intended port thus requiring data to be resent to another port. Opening thousands of ports in this manner, however, renders a firewall more like a switch than a firewall and severely compromises network security.

There is thus a need for systems and methods which reduce the number of open ports required in a firewall to perform storage operations in a computer network.

SUMMARY OF THE INVENTION

In some embodiments, the present invention provides systems and methods for performing storage operations through a firewall.

In one embodiment, the invention provides a method for performing storage operations through a firewall in a networked computer system, including identifying, based on configuration data, whether each of a set of network elements is within a trusted network or not within the trusted network. Traffic between elements within the trusted network and elements not within the trusted network must pass through the firewall. The method further includes, prior to performing a storage operation through the firewall, allocating a specific set of ports, in accordance with at least one security parameter, for use in performing the storage operation.

In another embodiment, the invention provides a method for performing storage operations through a firewall in a networked computer system, including identifying, based on configuration data, a first set of network elements which are within a trusted network and a second set of network elements which are not within the trusted network. Traffic between elements within the trusted network and elements not within the trusted network must pass through the firewall. The invention further includes, prior to performing a storage operation through the firewall, allocating a specific set of ports, according to at least one security parameter, for use in performing the storage operation. The method further includes, during the storage operation, monitoring traffic through each of the specific ports. The method further includes, if, through the monitoring, traffic is determined to be inactive through a first port of the specific ports for a specified time period, sending a packet through the first port.

In another embodiment, the invention provides a system for performing storage operations through a firewall in a networked computer system. The system includes a firewall and a plurality of network elements, including one or more client computers and one or more storage devices. The system further includes a storage manager. The system further includes one or more media agents which conduct data between the one or more client computers and the one or more storage devices under the direction of the storage manager. The storage manager identifies, based on configuration data, a first set of network elements which are within a trusted network and a second set of network elements which are not within the trusted network. Traffic between elements of the trusted network and elements not within the trusted network must pass through the firewall. Further, the storage manager, prior to performing a storage operation through the firewall, allocates a specific set of ports, according to at least one security parameter, for use in performing the storage operation. During a storage operation, the firewall opens ports in accordance with the allocation.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
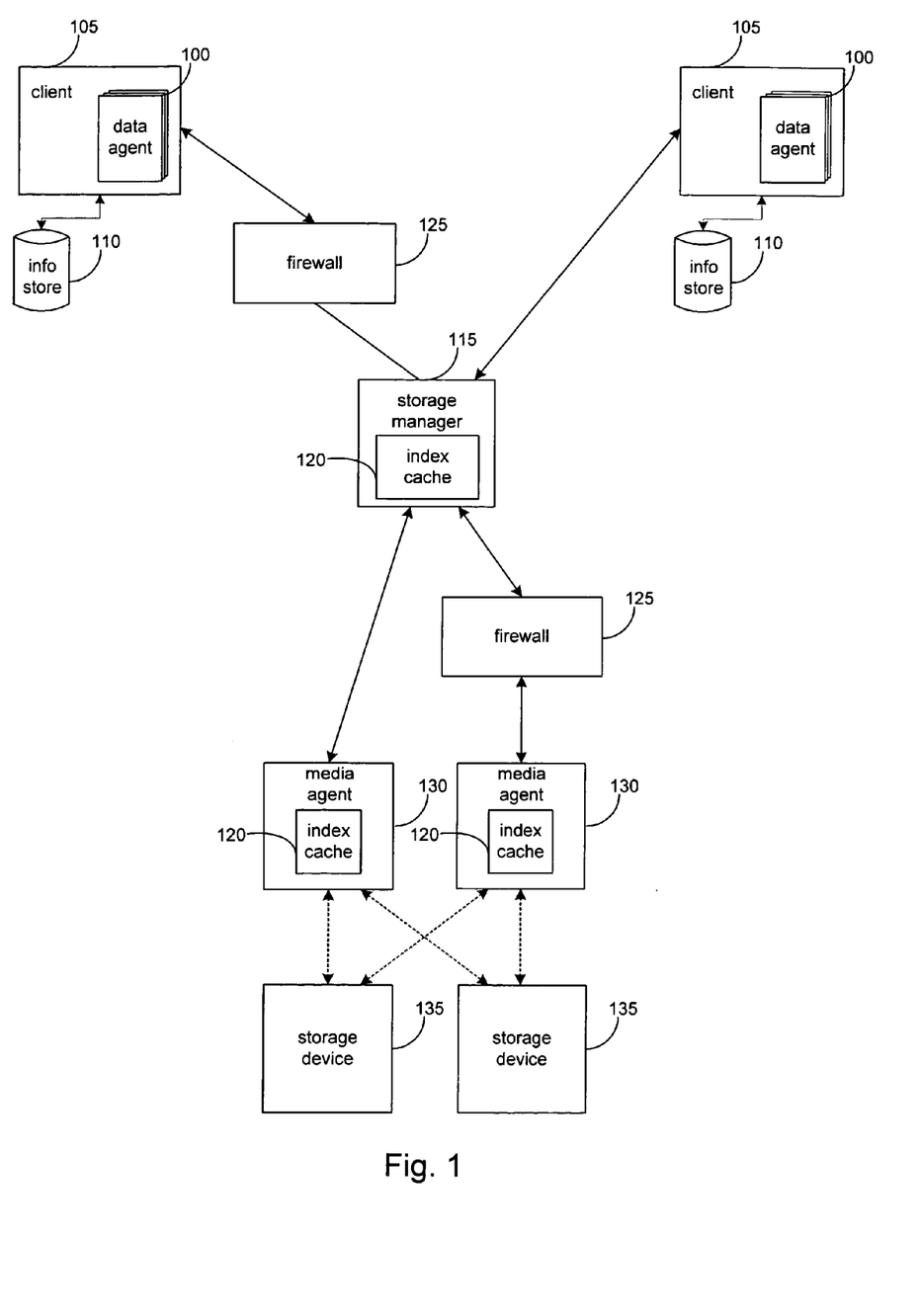
FIG. 1 is a block diagram of a network architecture for a system to perform storage operations through a firewall according to an embodiment of the invention.

With reference to FIG. 1 embodiments of the invention are presented. FIG. 1 presents a block diagram of a network architecture for a system to perform storage operations on electronic data in a computer network according to an embodiment of the invention. As shown, the system includes a storage manager 115 and one or more of the following: a data agent 100, a client 105, an information store 110, an index cache 120, a firewall 125, a media agent 130, and a storage device 135. The system and elements thereof are exemplary of a three-tier backup system such as the CommVault Galaxy backup system, available from CommVault Systems, Inc. of Oceanport, N.J., and further described in application Ser. No. 09/610,738 which is incorporated herein by reference in its entirety.

A data agent 100 is generally a software module that is generally responsible for archiving, migrating, and recovering data of a client computer 105 stored in an information store 110 or other memory location. Each client computer 105 has at least one data agent 100 and the system can support many client computers 107. The system provides a plurality of data agents 100 each of which is intended to backup, migrate, and recover data associated with a different application. For example, different individual data agents 100 may be designed to handle Microsoft Exchange data, Lotus Notes data, Microsoft Windows 2000 file system data, Microsoft Active Directory Objects data, and other types of data known in the art.

If a client computer 105 has two or more types of data, one data agent 100 is generally required for each data type to archive, migrate, and restore the client computer 105 data. For example, to backup, migrate, and restore all of the data on a Microsoft Exchange 2000 server, the client computer 105 would use one Microsoft Exchange 2000 Mailbox data agent 100 to backup the Exchange 2000 mailboxes, one Microsoft Exchange 2000 Database data agent 100 to backup the Exchange 2000 databases, one Microsoft Exchange 2000 Public Folder data agent 100 to backup the Exchange 2000 Public Folders, and one Microsoft Windows 2000 File System data agent 100 to backup the client computer's 105 file system. These data agents 100 would be treated as four separate data agents 100 by the system even though they reside on the same client computer 105.

The storage manager 115 is generally a software module or application that coordinates and controls the system. The storage manager 115 communicates with all elements of the system including data agents 100, client computers 105, firewalls 125, media agents 130, and storage devices 135, to initiate and manage system backups, migrations, and recoveries, as well as perform other storage-related operations.

A media agent 130 is generally a media management software module that conducts data, as directed by the storage manager 115, between the client computer 105 and one or more storage devices 135 such as a tape library, a magnetic media storage device, an optical media storage device, or other storage device. The media agent 130 is communicatively coupled with and controls the storage device 135. For example, the media agent 130 might instruct the storage device 135 to use a robotic arm or other means to load or eject a media cartridge, and to archive, migrate, or restore application specific data. The media agent 130 generally communicates with the storage device 135 via a local bus such as a SCSI adaptor. In some embodiments, the storage device 135 is communicatively coupled to the data agent 130 via a Storage Area Network ("SAN").

Each media agent 130 maintain an index cache 120 which generally stores index data the system generates during backup, migration, and restore storage operations as further described herein. For example, storage operations for Microsoft Exchange data generate index data such as file names, file locations, media identifiers, and other information. Index data provides the system with an efficient mechanism for locating user files for recovery operations. This index data is generally stored with the data backed up to the storage device 135, and the media agent 130 that controls the storage operation also writes an additional copy of the index data to its index cache 120. The data in the media agent 130 index cache 120 is thus readily available to the system for use in storage operations and other activities without having to be first retrieved from the storage device 135.

The storage manager 115 also maintains an index cache 120. Index data is also used to indicate logical associations between components of the system, user preferences, management tasks, network pathways, data associations, storage policies, user preferences, and other useful data. For example, the storage manager 115 might use its index cache 120 to track logical associations between media agents 130 and storage devices 135.

Index caches 120 typically reside on their corresponding storage component's hard disk or other fixed storage device. Like any cache, the index cache 120 has finite capacity and the amount of index data that can be maintained directly corresponds to the size of that portion of the disk that is allocated to the index cache 120. In one embodiment, the system manages the index cache 120 on a least recently used ("LRU") basis as known in the art. When the capacity of the index cache 120 is reached, the system overwrites those files in the index cache 120 that have been least recently accessed with the new index data. In some embodiments, before data in the index cache 120 is overwritten, the data is copied to an index cache 120 copy in a storage device 135. If a recovery operation requires data that is no longer stored in the index cache 120, such as in the case of a cache miss, the system recovers the index data from the index cache 120 copy stored in the storage device 135.

As previously discussed, firewalls 125 reside between components of the system and generally function to prevent unauthorized access to the system. Thus, for example, a firewall 125 may reside between a client 105 and the storage manager 125, between the storage manager 125 and a media agent 130, or between other system components. For example, a remote client 105 across the Internet or other wide area network may pass traffic associated with storage operations and other operations to the system via a firewall 125. As another example, the system may perform remote storage operations, such as remote disaster recovery operations or other operations, and pass traffic associated with storage operations from the storage manager 125 across the Internet or other wide area network to a remote media agent 130. These examples are not intended to be limiting and other useful configurations will be readily apparent to those skilled in the art.

In some embodiments, components of the system may reside and execute on the same computer. In some embodiments, a client computer 105 component such as a data agent 100, a media agent 130, or a storage manager 115 coordinates and directs local archiving, migration, and retrieval application functions as further described in application Ser. No. 09/610,738. This client computer 105 component can function independently or together with other similar client computer 105 components.

The system increases security of storage operations through a firewall 125 by, among other things, drastically reducing the number of ports required as compared to existing storage management systems. The system negotiates a limited number of ports in advance, so that only certain pre-established ports need be open to storage operation traffic. The system also provides a built-in timeout value which is less than the firewall 125 timeout value to eliminate firewall 125 timeouts requiring further renegotiation to open another port.

A port configuration file specifying the ports to open for each system computer is stored in the index cache 120 or other memory of each machine. In some embodiments, the storage manager 115 index cache 120 also contains a master list of all open ports for all computers in the system which can be accessed by and distributed to other machines in the system as necessary. For example, a port configuration file may specify that only ports 8600 to ports 8620 should be opened for use by the system. System hardware and software modules will thus only listen to those ports and all other available ports will remain closed unless requested by some other application, service, process, etc.

The system reserves and also limits the number of ports used by each system component such as the storage manager 115, data agents 100, and media agents 130. In one embodiment, port limitations are based on the minimal number of ports required to conduct storage operations.

For example, the storage manager 115 is allocated seven ports. Three ports carry control data such as start and stop messages, control checksums, parity blocks, and other control data. Three additional ports serve as reserve ports and may be used to support traffic overflow or additional control signals. The final port is used to conduct traffic associated with a graphical user interface ("GUI"). For example, in some embodiments, users at client computers 105 can remotely access the storage manager 115 control GUI and other GUI interfaces. The final port is used to carry signals associated with remote access to the GUI. As another example, the final port also carries signals associated with a user at the storage manager 115 remotely accessing GUIs at clients 115 and media agents 130. Media agents 115 and data agents 100 are allocated two ports each: one port sends data upstream from the component to the storage manager 115 and one port receives data sent downstream from the storage manager 115 to the component. In some embodiments, media agents 115 and data agents 100 are allocated two additional ports to communicate upstream and downstream with other media agents 115 or data agents 100. Additional pairs of ports can be allocated to media agents 115 and data agents 100 to provide increased bandwidth, such as for additional backup streams or restore streams.

A "hostile computer" configuration file specifying a list of "hostile" computers is also stored in the index cache 120 or other memory of each machine. In some embodiments, the storage manager 115 index cache 120 also contains a master list of all "hostile" computers in the system which can be accessed by and distributed to other machines in the system as necessary. In some embodiments, a "friendly computer" configuration file specifying a list of "friendly computers is used instead of or concurrently with a "hostile computer" configuration file.

This second configuration file enables, among other thing, the system to determine which computers should pass traffic through the listed firewall 125 ports in the port configuration file and which computers are exempt from passing traffic through the firewall 125. For example, computers behind the firewall 125 can pass traffic through any ports since they are within the "trusted" network and thus their network traffic does not need to be evaluated by the firewall 125. Conversely, when one computer is behind the firewall 125 and one computer is not, then traffic between those computers must pass through the firewall 125 via the ports specified in the ports configuration file.

According to one embodiment of the invention, the "hostile computer" configuration file specifying the list of "hostile" computers lists all computers which are on the other side or "hostile" side of the firewall 125 from the computer on which the second configuration file is stored. Traffic with computers not on the list (e.g.—"friendly" computers) is routed directly, however, traffic with computers on the list (e.g.—"hostile" computers) is routed through the firewall 125. Thus if the storage manager 115 and a media agent 130 are on the "friendly" side of the firewall 125 and a data agent 100 is on the "hostile" side, the storage manager 125 and the media agent 130 configuration files would each list the data agent 100, and the data agent 100 configuration file would list both the storage manager 125 and the media agent 130. Computers identified on the second configuration file list are identified according to a network address, an IP address, a DNS entry, a UNC pathway, or other network identifier known in the art.

At startup, system components, such as data agents 100, data agents 130, and the storage manager 115 access their ports configuration files and the "hostile computer" configuration files. Data is thus routed through ports in the firewall 125 as appropriate and according to security parameters set forth in the configuration files.

The system also stores a "keep alive" value or key in the index cache 120 or other memory of each machine. The "keep alive" value is generally a value that is less than the connection timeout value specified in the firewall 125 configuration files. The system uses the "keep alive" value, among other things, to prevent the firewall 125 from timing out connections or otherwise closing ports due to network connection failures, slowdowns, or other events which might create vulnerabilities. The system tracks the time period that a connection between a system component, as a data agent 100, and a firewall 125 has remained idle. If the connection remains idle for a period of time equal or greater than the "keep alive" value, then the system sends a "dummy" packet or other similar packet to the firewall 125 to refresh the connection and restart the timer on the firewall connection timeout value.

In some embodiments, it may be necessary or desirable that chunk creation time be less than a firewall time-out interval, to prevent firewall time-out from occurring. Therefore, if chunk creation time is greater than the firewall time-out interval, then chunk size may be reduced, such as by the storage manager, as necessary to reduce chunk creation time to less than that of the firewall time-out interval.

Figure 2:
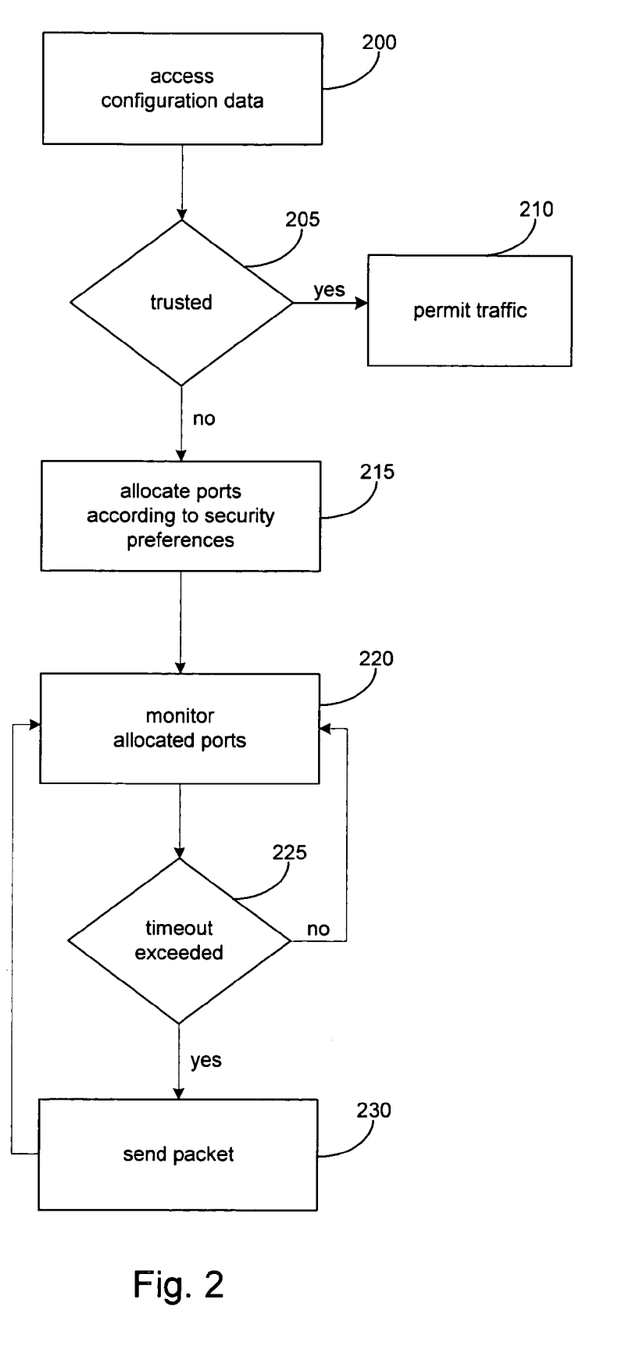
FIG. 2 is a flow diagram of a method of performing storage operations through a firewall according to an embodiment of the invention.

FIG. 2 presents a flow diagram of a method of performing storage operations through a firewall according to an embodiment of the invention. The system accesses configuration data, step 200. For example, in some embodiments, the system loads a configuration file specifying system components as hostile or trusted. The system checks the status of a component, step 205. If a system component is trusted, then traffic is permitted without having to pass through the firewall, step 210. For example, trusted components inside the firewall may not be required to pass traffic through the firewall. If a component is not trusted, the system allocates one or more specified ports to that component according to security preferences, step 215. The system monitors ports allocated to components, step 220, and determines whether a time period, for example a firewall timeout setting, has been exceeded, step 225. In some embodiments, the system monitors to determine whether traffic has passed through an allocated port within the time period. If the time period has not been exceeded, control returns to step 220 and the system continues to monitor traffic. Otherwise, if the time period has been exceeded, the system sends a packet, such as a dummy packet to prevent a port closing, through the port, step 230, and control returns to step 220.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for performing a data storage operation through a firewall in a networked computer system, the method comprising:
   identifying, based on configuration data, whether each of a set of network elements related to the data storage operation is within a trusted network or not within the trusted network, wherein traffic between elements within the trusted network and elements not within the trusted network must pass through the firewall, wherein the firewall is an element in the networked computer system that is not a firewall in a client computer system;
   when the set of network elements related to the data storage operation is such that storage operation data must pass through the firewall, determining a specific set of ports to be used to send and receive storage operation data,
      wherein storage operation data includes data associated with at least one of a backup operation, a restore operation, a migration operation, an archival operation, and a recovery operation, and
      wherein the specific set of ports includes a first set of one or more ports and a second set of one or more ports:
         wherein the first set of one or more ports are one or more ports through which storage operation data is to pass; and
         wherein the second set of one or more ports are one or more ports through which data associated with control of the data storage operation is to pass; and
   prior to receipt by the firewall of storage operation data, allocating the specific set of ports with the firewall in advance, in accordance with at least one security parameter, for use in performing the data storage operation.

2. The method of claim 1, wherein ports to be utilized during the data storage operation are limited to the specific set of ports.

3. The method of claim 1, wherein the specific set of ports allocated according to the at least one security parameter is a minimal number of ports needed to conduct the data storage operation.

4. The method of claim 1, wherein traffic between network elements within the trusted network does not pass through the firewall.

5. The method of claim 1, wherein the configuration data resides in a port configuration file.

6. The method of claim 5, wherein allocating the specific set of ports comprises reading the port configuration file.

7. The method of claim 1, wherein the specific set of ports with the firewall is allocated by a storage manager.

8. The method of claim 1, wherein the specific set of ports with the firewall is allocated by a storage manager that allocates one or more of the ports in the specific set for each of one or more media agents, and one or more of the ports in the specific set for each of one or more data agents.

9. The method of claim 1, wherein storage operation data comprises chunks having sizes, and wherein the method further comprises reducing chunk size to be utilized during the data storage operation as necessary to cause chunk creation time to be less than a firewall time-out interval.

10. The method of claim 1, wherein storage operation data comprises chunks having sizes, and wherein the method further comprises reducing chunk size to be utilized based at least in part upon a transmission rate of the storage operation data.

11. The method of claim 1, wherein the data associated with control of the data storage operation includes at least one of:
   start and stop messages;
   control checksums; and
   parity blocks.

12. The method of claim 1, further comprising performing the data storage operation through the firewall, wherein performing the data storage operation includes:
   transferring storage operation data through the first set of one or more ports in the firewall; and
   transferring data associated with control of the data storage operation through the second set of one or more ports in the firewall.

13. A system for performing a data storage operation through a firewall in a networked computer system, the system comprising:
   a firewall, wherein the firewall is a distinct element in the networked computer system and is not a firewall of a client computer;
   a plurality of network elements, comprising:
      one or more client computers; and
      one or more data storage devices;
   a storage manager; and
   one or more media agents configured to conduct data between the one or more client computers and the one or more data storage devices under the direction of the storage manager,
   wherein the storage manager is configured to:
      identify, based on configuration data, a first set of network elements related to the data storage operation that are within a trusted network and a second set of network elements related to the data storage operation that are not within the trusted network, wherein traffic between elements of the trusted network and elements not within the trusted network must pass through the firewall;
      when the first and second sets of network elements related to the data storage operation are such that storage operation data must pass through the firewall, determine a specific set of ports to be used to send and receive the storage operation data, wherein the specific set of ports includes:
         a first set of one or more ports through which storage operation data is to pass; and
         a second set of one or more ports through which data associated with control of the data storage operation is to pass; and
      prior to receipt by the firewall of the storage operation data, allocate the specific set of ports with the firewall in advance, according to at least one security parameter, for use in performing the data storage operation,
   wherein, prior to receipt of the storage operation data, the firewall opens ports in accordance with the allocation.

14. The system of claim 13, wherein ports to be utilized during the data storage operation are limited to the specific set of ports.

15. The system of claim 13, wherein the specific set of ports allocated according to the at least one security parameter is a minimal number of ports needed to conduct the data storage operation.

16. The system of claim 13, wherein the configuration data resides in a port configuration file.

17. The system of claim 16, wherein allocating the specific set of ports comprises reading the port configuration file.

18. The system of claim 13, wherein the storage manager is further configured to:
   during the data storage operation, cause monitoring of traffic through each of the specific ports; and
   if, through the monitoring, traffic is determined to be inactive through a first port of the specific ports for a specified time period, cause a packet to be sent through the first port.

19. The system of claim 18, wherein the packet is sent to prevent closing of the first port due to a firewall time-out.

20. The system of claim 18, wherein the specified time period is less than a firewall time-out period.

21. The system of claim 13, wherein the data associated with control of the data storage operation includes at least one of:
   start and stop messages;
   control checksums; and
   parity blocks.

22. A system for performing a data storage operation involving multiple network elements in a networked computer system, including one or more client computers and one or more data storage devices, wherein the data storage operation si performed through a firewall in the networked computer system, the system comprising:
   one or more media agents configured to transfer storage operation data between the one or more client computers and the one or more data storage devices; and
   a storage manager configured to:
      identify, based on configuration data, a first set of network elements related to the data storage operation that are within a trusted network and a second set of network elements related to the data storage operation that are not within the trusted network, wherein traffic between network elements within the trusted network and network elements not within the trusted network must pass through the firewall;
      when the first and second sets of network elements related to the data storage operation are such that storage operation data must pass through the firewall:
         determine a first set of one or more firewall ports through which the one or more media agents are to transfer storage operation data between the one or more client computers and the one or more data storage devices; and
         determine a second set of one or more firewall ports through which data associated with control of the data storage operation is to pass; and
      prior to receipt by the firewall of the storage operation data, allocate the first and second sets of firewall ports with the firewall,
   wherein the firewall is a distinct network element in the networked computer system and is not a firewall of a client computer, and wherein prior to receipt of the storage operation data, the firewall opens the first and second sets of ports in accordance with the allocation.

23. The system of claim 22, wherein the data associated with control of the data storage operation includes at least one of:
- start and stop messages;
- control checksums; and
- parity blocks.

24. The system of claim 22, wherein the storage manager is further configured to:
- determine a third set of one or more firewall ports through which additional storage operation data or additional data associated with control of the data storage operation may pass; and
- prior to receipt by the firewall of the storage operation data, allocate the third set of firewall ports with the firewall.

25. The system of claim 22, wherein the storage manager is further configured to:
- determine a third set of one or more firewall ports through which traffic associated with a graphical user interface is to pass; and
- prior to receipt by the firewall of the storage operation data, allocate the third set of firewall ports with the firewall.

* * * * *

UNITED STATES PATENT AND TRADEMARK OFFICE
CERTIFICATE OF CORRECTION

| | |
|---|---|
| PATENT NO. | : 7,631,351 B2 |
| APPLICATION NO. | : 10/818747 |
| DATED | : December 8, 2009 |
| INVENTOR(S) | : Andrei Erofeev |

Page 1 of 1

It is certified that error appears in the above-identified patent and that said Letters Patent is hereby corrected as shown below:

In column 1, line 30, delete "2003," and insert -- 2003. --, therefor.

In column 8, line 37, in Claim 1, delete "ports:" and insert -- ports; --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,631,351 B2 |
| APPLICATION NO. | : 10/818747 |
| DATED | : December 8, 2009 |
| INVENTOR(S) | : Andrei Erofeev |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 896 days.

Signed and Sealed this

Second Day of November, 2010

David J. Kappos
*Director of the United States Patent and Trademark Office*